(12) United States Patent
Sidhu et al.

(10) Patent No.: US 8,069,208 B2
(45) Date of Patent: Nov. 29, 2011

(54) PEER-TO-PEER BUDDY REQUEST AND RESPONSE

(75) Inventors: Gursharan Sidhu, Seattle, WA (US); Noah Horton, Sammamish, WA (US); Sandeep K. Singhal, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 806 days.

(21) Appl. No.: 11/408,895

(22) Filed: Apr. 21, 2006

(65) Prior Publication Data

US 2007/0250582 A1    Oct. 25, 2007

(51) Int. Cl.
*G06F 13/00* (2006.01)

(52) U.S. Cl. ...................................... 709/206

(58) Field of Classification Search .............. 709/204, 709/206; 713/168, 176, 178; 370/395.31, 370/395.32, 390, 392
See application file for complete search history.

(56) References Cited

U.S. PATENT DOCUMENTS

| | | |
|---|---|---|
| 5,854,898 A | 12/1998 | Riddle |
| 5,917,480 A | 6/1999 | Tafoya et al. |
| 5,987,376 A | 11/1999 | Olson et al. |
| 6,078,948 A | 6/2000 | Podgorny et al. |
| 6,108,687 A | 8/2000 | Craig |
| 6,155,840 A | 12/2000 | Sallette |
| 6,163,809 A | 12/2000 | Buckley |
| 6,216,110 B1 | 4/2001 | Silverberg |
| 6,237,025 B1 | 5/2001 | Ludwig |
| 6,363,352 B1 | 3/2002 | Dailey et al. |
| 6,526,411 B1 | 2/2003 | Ward |
| 6,529,932 B1 | 3/2003 | Dadiomov et al. |
| 6,636,889 B1 | 10/2003 | Estrada et al. |
| 6,658,568 B1 | 12/2003 | Ginter et al. |
| 6,675,205 B2 | 1/2004 | Meadway et al. |
| 6,701,344 B1 | 3/2004 | Holt et al. |
| 6,714,966 B1 | 3/2004 | Holt et al. |
| 6,728,753 B1 | 4/2004 | Parasnis et al. |
| 6,745,178 B1 | 6/2004 | Emens et al. |
| 6,791,582 B2 | 9/2004 | Linsey et al. |
| 6,801,604 B2 | 10/2004 | Maes et al. |
| 6,968,179 B1 | 11/2005 | De Vries |
| 7,242,766 B1 * | 7/2007 | Lyle ................................. 380/2 |
| 7,478,120 B1 * | 1/2009 | Zhang ........................... 709/201 |
| 2001/0035976 A1 | 11/2001 | Poon |
| 2001/0053213 A1 | 12/2001 | Truong et al. |
| 2002/0073204 A1 | 6/2002 | Dutta et al. |
| 2002/0097267 A1 | 7/2002 | Dinan et al. |

(Continued)

FOREIGN PATENT DOCUMENTS

GB    2378268    2/2003

(Continued)

OTHER PUBLICATIONS

International Search Report for PCT/US2007/009887 mailed Oct. 22, 2007.

(Continued)

*Primary Examiner* — Robert B Harrell

(57) ABSTRACT

A system for providing secure asynchronous message publishing and retrieval in a serverless environment. The system may be used on ad-hoc and segmented networks such as peer-to-peer networks. The system may provide a method of sending and storing asynchronous message requests/responses via a Distributed Hash Table (DHT), a method for establishing RSS feeds via the asynchronous messaging service, a method for publishing a request for Internet Message buddy authorization and of retrieving pending buddy requests.

20 Claims, 9 Drawing Sheets

U.S. PATENT DOCUMENTS

| | | | |
|---|---|---|---|
| 2002/0140730 A1 | 10/2002 | Linsey et al. | |
| 2002/0143989 A1 | 10/2002 | Huitema et al. | |
| 2002/0154172 A1 | 10/2002 | Linsey et al. | |
| 2002/0184358 A1 | 12/2002 | Traversat et al. | |
| 2003/0014485 A1 | 1/2003 | Banatwala | |
| 2003/0036941 A1 | 2/2003 | Leska et al. | |
| 2003/0055892 A1 | 3/2003 | Huitema et al. | |
| 2003/0078058 A1* | 4/2003 | Vatanen et al. | 455/466 |
| 2003/0088544 A1 | 5/2003 | Kan et al. | |
| 2003/0126027 A1 | 7/2003 | Nelson et al. | |
| 2003/0135629 A1 | 7/2003 | Sasaki et al. | |
| 2003/0163683 A1* | 8/2003 | Xu et al. | 713/153 |
| 2003/0217073 A1 | 11/2003 | Walther et al. | |
| 2003/0217106 A1* | 11/2003 | Adar et al. | 709/206 |
| 2004/0063401 A1 | 4/2004 | Meckelburg et al. | |
| 2004/0064693 A1* | 4/2004 | Pabla et al. | 713/168 |
| 2004/0078436 A1 | 4/2004 | Demsky et al. | |
| 2004/0082351 A1 | 4/2004 | Westman | |
| 2004/0088325 A1 | 5/2004 | Elder et al. | |
| 2004/0111423 A1 | 6/2004 | Irving et al. | |
| 2004/0117446 A1 | 6/2004 | Swanson | |
| 2004/0122898 A1 | 6/2004 | Srinivasa | |
| 2004/0122901 A1 | 6/2004 | Sylvain | |
| 2004/0128350 A1 | 7/2004 | Topfl et al. | |
| 2004/0141005 A1 | 7/2004 | Banatwala et al. | |
| 2004/0143603 A1 | 7/2004 | Kaufmann et al. | |
| 2004/0148505 A1* | 7/2004 | Qiu | 713/175 |
| 2004/0172455 A1 | 9/2004 | Green et al. | |
| 2004/0172456 A1 | 9/2004 | Green et al. | |
| 2004/0184445 A1 | 9/2004 | Burne | |
| 2004/0249970 A1 | 12/2004 | Castro et al. | |
| 2004/0249972 A1* | 12/2004 | White et al. | 709/243 |
| 2004/0260771 A1 | 12/2004 | Gusler et al. | |
| 2005/0009537 A1 | 1/2005 | Crocker et al. | |
| 2005/0027805 A1 | 2/2005 | Aoki | |
| 2005/0038856 A1 | 2/2005 | Krishnasamy et al. | |
| 2005/0066001 A1 | 3/2005 | Benco et al. | |
| 2005/0080859 A1 | 4/2005 | Lake | |
| 2005/0081033 A1* | 4/2005 | Viot et al. | 713/170 |
| 2005/0102245 A1 | 5/2005 | Edlund et al. | |
| 2005/0102356 A1 | 5/2005 | Manion et al. | |
| 2005/0135381 A1 | 6/2005 | Dubnicki et al. | |
| 2005/0171799 A1 | 8/2005 | Hull et al. | |
| 2005/0198173 A1 | 9/2005 | Evans | |
| 2005/0203901 A1* | 9/2005 | Waldvogel et al. | 707/5 |
| 2005/0228824 A1* | 10/2005 | Gattuso et al. | 707/104.1 |
| 2005/0235038 A1 | 10/2005 | Donatella et al. | |
| 2006/0005013 A1* | 1/2006 | Huitema et al. | 713/162 |
| 2006/0114839 A1* | 6/2006 | Meier et al. | 370/254 |
| 2006/0173959 A1* | 8/2006 | McKelvie et al. | 709/204 |
| 2006/0265436 A1* | 11/2006 | Edmond et al. | 707/204 |
| 2007/0121631 A1* | 5/2007 | Krikorian et al. | 370/392 |
| 2007/0143619 A1* | 6/2007 | Goodman et al. | 713/176 |
| 2007/0192676 A1* | 8/2007 | Bodin et al. | 715/501.1 |
| 2009/0019141 A1* | 1/2009 | Bush et al. | 709/223 |

FOREIGN PATENT DOCUMENTS

| | | |
|---|---|---|
| JP | 2002197246 | 11/2001 |
| WO | WO-0120450 | 3/2001 |
| WO | WO-2004009550 A1 | 7/2004 |

OTHER PUBLICATIONS

Written Opinion for PCT/US2007/009887 mailed Oct. 22, 2007.

"Connecting and Extending Peer-to-Peer Networks," Lion Share White Paper, dated Oct. 2004, 32 pages, http://lionshare.its.psu.edu/main/info/docspresentation/LionshareWP.pdf.

Castro et al., "Topology-Aware Routing In Structured Peer-to-Peer Overlay Networks," Technical Report MSR-TR-2002-82, Microsoft Research, Microsoft Corporation, http://www.research.microsoft.com.

Castro et al., "Secure Routing For Structured Peer-to-Peer Overlay Networks," Usenix, OSDI '02 Paper (OSDI '02 Tech Program Index) pp. 299-314 of the Proceedings, Fifth Symposium on Operating Systems Design and Implementation (OSDI 2002) 33 pages, http://www.usenix.org/events/osdi02/tech/full_papers/castro/castro_html/.

Cheung, "Chatopus for Palm OS, Using IM Bots for Jabber," Chatopus-Palm OS Instant Messaging Client for XMPP/Jabber, Dated Oct. 20, 2002 (Last updated: Jun. 25, 2005), 6 pages, http://www.chatopus.com/articles/bots.html.

"Presence and Awareness Services," Ramiro Liscano, Professor, SITE, University of Ottawa, 89 pages, dated Jun. 11, 2003; http://www.site.uottawa.ca/-rliscano/tutorials/PresenceAwarenessServices.pdf.

"At What Cost Pervasive? A Social Computing View of Mobile Computing Systems," IBM Research: vol. 38, No. 4, 1999, Pervasive Computing (28 pgs.).

"Design Expllorations," IBM Research: Social Computing Group (4 pgs.).

"IBM Lotus Instant Messaging and Web Conferencing," IBM Software—IBM Lotus Instant Messaging and Web Conferencing home page (3 pgs.).

"IBM Workplace Collaboration Services Overview Guide" dated Jan. 2005, 2 pages. (Printed from ftp://ftp.lotus.com/pub/lotusweb/IGM_Workplace_collaboration_services_g224733301_118.pdf on Jul. 1, 2005).

"Publication Related to Pastry," http://research.microsoft.com/~antr/Pastry/pubs.htm.

The Gnutella Protocol Specification v0.4, http://www.clip2.com.

About Presentation Broadcasting, 3 pages printed Jul. 1, 2005 from http://office.microsoft.com/en-us/assistance/HP052411931033.aspx.

Bouvin, "Designing User Interfaces for Collaborative Web-Based Open Hypermedia," in Proceedings of the Eleventh ACM Conference on Hypertext and Hypermedia, pp. 230-231 (San Antonio, TX, 2000).

Boyer et al., "Virtual Social Clubs: Meeting Places for the Internet Community," IEEE International Conference on Multimedia Computing and Systems, pp. 297-301 (Florence, Italy, Jun. 7-11, 1999).

Cheng et al., "Hutchworld: Lessons Learned. A Collaborative Project: Fred Hutchinson Cancer Research Center & Microsoft Research," in Proceedings of Second International Conference on Virtual Worlds (VW 2000), pp. 1-2 (Paris, France, Jul. 5-7, 2000). http://research.microsoft.com/scg/papers/hutchvw2000.pdf.

Cugola et al., "Peer to Peer for Collaborative Applications," in Proceedings of the 22nd International Conference on Distributed Computing Systems Workshops (ICDCS'02), pp. 359-364 (Vienna, Austria, Jul. 2-5, 2002).

Dabek, F., et al., Building Peer-to-Peer Systems With Chord, a Distributed Lookup Serivce, at MIT Laboratory for Computer Science, 6 pages, at http://pdos.lcs.mit.edu/chord.

Dorohonceanu et al., "A Desktop Design for Synchronous Collaboration," in Proceedings of the Graphics Interface '99 (GI'99), pp. 27-35 (Kingston, Ontario, Canada, Jun. 1999).

Druschel, P., et al., PAST: A large-scale, persistent peer-to-peer storage utility, at Rice University and Microsoft Research, 6 pages.

Duhr, "Oberflachenelemente in interaktiven and kooperativen anwendungen," Universitat Oldenburg, Department of Information Systems Thesis (Aug. 2000).

Ellison, C., et al., Simple Public Key Certificate, (Internet Draft 1999), at http://www.world.std.com/~cme/spki.txt (Aug. 6, 2001).

Ellison, C., et al., SPKI Certificate Theory, (The Internet Society 1999), at http://www.ietf.org/rfc/rfc2693.txt?number=2693 (Aug. 6, 2001).

Ellison, C., SPKI Requirements, (The Internet Society 1999), at http://www.ietf.org/rfc/rfc2692.txt?number=2692 (Aug. 6, 2001).

Erdelsky, P., The Birthday Paradox, EFG, at http://www.efgh.com/math/birthday.htm (Mar. 8, 2002).

Farnham et al., "Supporting Sociability in a Shared Browser," in Proceedings of Interact Conference (Tokyo, Japan, Jul. 2001) http://research.microsoft.com/scg/papers/sharedbrowsinginteract.pdf, pp. 1-8.

Garcia et al., "Extending a Collaborative Architecture to Support Emotional Awareness," EBAA '99—Workshop on Emotion-Based Agent Architectures, pp. 46-52 (May 2, 1999).

Greenberg et al, "Using a Room Metaphor to Ease Transitions in Groupware," University of Calgary, Department of Computer Science, Research Report 98/611/02, 31 pages (1998).

Greenberg, "Collaborative Interfaces for the Web," in Human Factors and Web Development, (Forsythe et al., eds.) Chapter 18, pp. 241-253, LEA Press, (1997).

Gutwin, "Workspace Awareness in Real-Time Distributed Groupware," The University of Calgary, Department of Computer Science, Ph.D. Thesis, 270 pages. (Dec. 1997).

Handley et al., "SIP: Session Initiation Protocol," Network Working Group, Request for Comments 2543, pp. 1-153 (Mar. 1999).

Kindberg, "Mushroom: A Framework for Collaboration and Interaction Acros the Internet," in Proceedings of the Fifth ERCIM Workshop on CSCW and the Web (St. Augustin, Germany, Feb. 1996).

Kollock et al., "Managing the Virtual Commons: Cooperation and Conflict in Computer Communities," in Computer-Mediated Communication: Linguistic, Social, and Cross-Cultural Perspectives, (Herring, ed.), pp. 109-128 (John Benjamins, Amsterdam, Netherlands, 1996) http://research.microsoft.com/scg/papers/KollockCommons.htm.

Kollock, "The Economies of Online Cooperation: Gifts and Public Goods in Cyberspace," in Communities in Cyberspace, (Smith et al, eds.), pp. 1-17 (Routledge, London, UK, 1999) http://www.sscnet.ucla.edu/soc/faculty/kollock/papers/economies.htm.

Lai, K. et al., Measuring Link Bandwidths Using a Deterministic Model of Packet Delay, at Department of Computer Science at Stanford University, 13 pages.

Langley, A., The Freenet Protocol, The Free Network Project, at http://freenet.sourceforge.net/index/php?page=protocol (May 21, 2001).

Lee et al., "Supporting Multi-User, Multi-Applet Workspaces in CBE," in Proceedings of the ACM 1996 Conference on Computer Supported Cooperative Work, pp. 344-353 (Cambridge, MA, 1996.

MeetingMaker—Meeting Maker printout, 2 pages printed on Jul. 1, 2005 from http://www.meetingmaker.com/products/meetingmaker/default.cfm.

MeetingMaker—WebEvent Publish printout, 2 pages printed on Jul. 1, 2005 from http://www.meetingmaker.com/products/webevent_publish/default.cfm.

QuickTime Broadcaster (3 pages) printed Jul. 1, 2005 from http://www.apple.com/quicktime/broadcaster/.

* cited by examiner

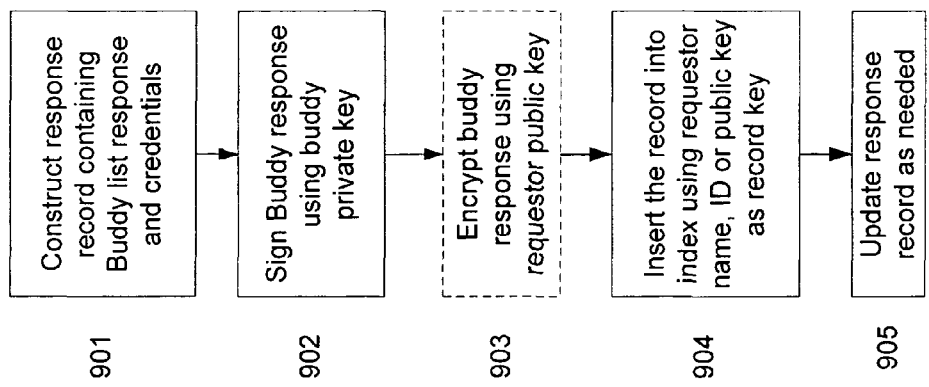

PEER-TO-PEER BUDDY REQUEST AND RESPONSE

BACKGROUND

Asynchronous messaging may be used in a number of different applications running on a network. However, these applications may use asynchronous messaging functions provide by a dedicated server, thereby hindering the application from functioning independently in a serverless system. One such application may be buddy list functionality in an instant messaging (IM) application.

Traditionally, messaging systems may use a dedicated server for receiving and publishing IM buddy request and reply messages. This system may require that all users subscribe to a particular service and trust that service, and all servers. The system may also require Internet connectivity. The use of a dedicated server also does not provide the flexibility that may be provided in a serverless system. Alternatively, email may be used as an asynchronous messaging system to facilitate request and response messages.

SUMMARY

The claimed system and method may provide an asynchronous messaging system that is trusted-server independent. The claimed system provides a security model for existing messaging systems that reduces the need for server based security. The asynchronous messaging system may be used in instant messaging (IM) systems over networks to securely publish buddy list requests and authenticate retrieved requests. The system may provide a method of sending and storing asynchronous message requests/responses via a Distributed Hash Table (DHT). The method may also be used in other asynchronous messaging applications over a serverless system, such as RSS feeds and providing update notifications in document management/file replications services.

DRAWINGS

FIG. 9 illustrates a buddy response publication process.

DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
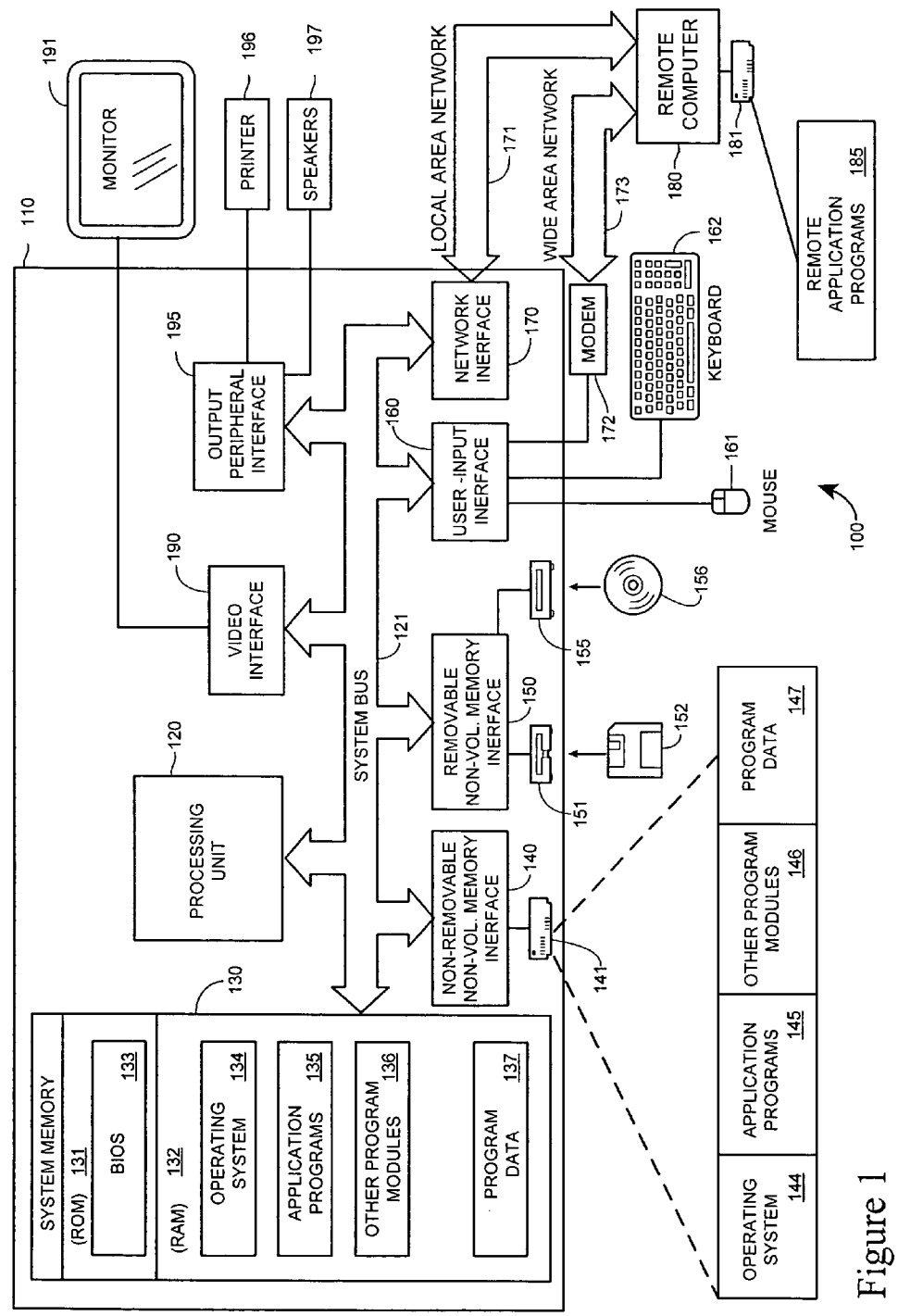
FIG. 1 illustrates a block diagram of a computing system that may operate in accordance with the claims.

FIG. 1 illustrates an example of a suitable computing system environment 100 on which a system for the blocks of the claimed method and apparatus may be implemented. The computing system environment 100 is only one example of a suitable computing environment and is not intended to suggest any limitation as to the scope of use or functionality of the method and apparatus of the claims. Neither should the computing environment 100 be interpreted as having any dependency or requirement relating to any one component or combination of components illustrated in the exemplary operating environment 100.

The blocks of the claimed method and apparatus are operational with numerous other general purpose or special purpose computing system environments or configurations. Examples of well known computing systems, environments, and/or configurations that may be suitable for use with the methods or apparatus of the claims include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The blocks of the claimed method and apparatus may be described in the general context of computer-executable instructions, such as program modules, being executed by a computer. Generally, program modules include routines, programs, objects, components, data structures, etc. that perform particular tasks or implement particular abstract data types. The methods and apparatus may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the blocks of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media may be any available media that may be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components may either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not illustrated) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections illustrated are exemplary and other means of establishing a communications link between the computers may be used.

Peer-to-peer (P2P) systems employ a network of nodes that communicate with each other in a decentralized manner, e.g., without the aid of a central server. Each node (e.g., an application or a device) in the peer-to-peer network may communicate with another node on the network through a direct connection, or each node may communicate indirectly using an intermediary node to relay communications to an intended node.

Figure 2:
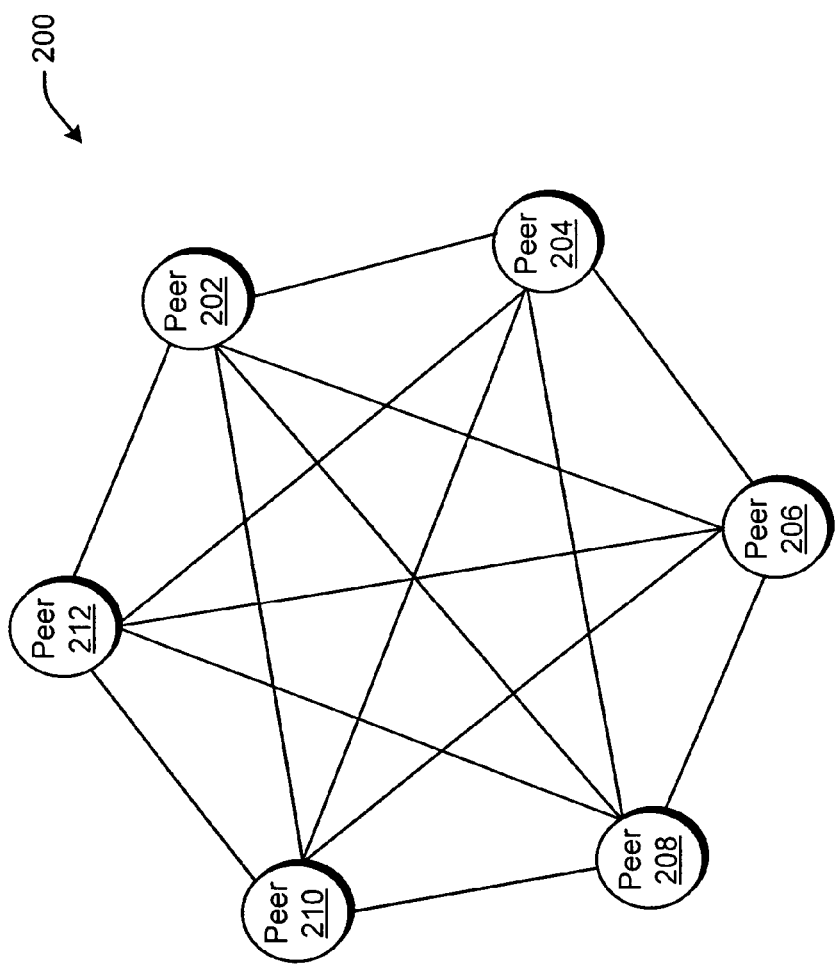
FIG. 2 illustrates a general peer-to-peer network.

FIG. 2 illustrates a high-level depiction of a P2P system 200. The system 200 includes a collection of peer entities (202-212). The peer entities (202-212) may be personal computer devices that are coupled together via a network or combination of networks. FIG. 2 illustrates an example in which each peer entity (202-212) is connected to all other peer entities (202-212). In other cases, one or more peer entities (202-212) may be connected to other peer entities (202-212) via one or more intermediary participants (202-212).

Certain applications, such as instant messaging applications, may be better suited for use in a decentralized, serverless network, such as a peer-to-peer network. However, existing IM applications may use a dedicated, central server to provide IM functionality, including providing and maintaining user-to-user communication links. While some IM applications may now be run over a peer-to-peer network in which communication links may be established between users without a server, certain IM functionality may still be maintained by a central server. For example, while some IM applications running on a peer-to-peer network may manage communication links without server assistance, the IM applications may still rely on a central server to provide Access Control List, or buddy list, functionality.

A user buddy list may represent a collection of other users, or buddies, with whom that user has a relationship. Being a buddy may mean having certain privileges. For example, the buddy may be able to obtain presence information about a user. This may be an indication that the user is online. Being a buddy may also allow that buddy to communicate with the user where other users may not be able to communicate. A buddy list is an example of an Access Control List, and all references in this document should be considered generic to all such Access Control Lists.

Figure 3:
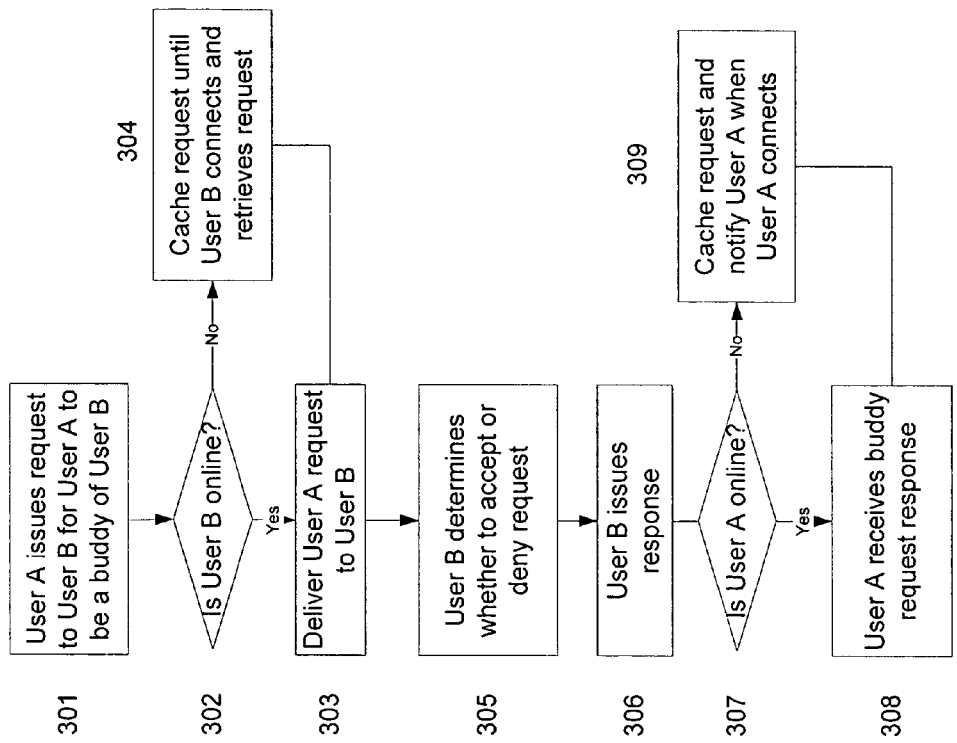
FIG. 3 illustrates a general buddy list creation process.

FIG. 3 illustrates a general asynchronous buddy list subscription process. Generally, when a first user A needs to create a buddy list, the user A may issue a request to a potential buddy requesting authorization to monitor/retrieve presence information 301. Because a user may not be online or connected all the time, an IM system may cache the request and response messages. Thus, a determination may first be made of whether user B is online 302. If user B is online, this request may be delivered to user B 303, otherwise the request maybe cached for later delivery 304. Upon receiving this request, the potential buddy determines whether to accept or decline the request 305, and issues an appropriate response 306. A determination may be made of whether the requestor is online at the time the response is issued 307. If the requestor is online, the requestor may receive the response 308 otherwise the request may be cached for later delivery 309. If the request is accepted, the response may be enable user A to retrieve presence information on user B and further communicate with user B.

This authorization process may usually be facilitated by a server, allowing the requestor to find the potential buddy, if the buddy is online, and/or cache the authorization request for later delivery, as discussed above. This server-based approach may require that all users signup for and trust a single server, and that they have Internet connectivity. An alternative mechanism may involve the use of e-mail (another asynchronous messaging process) to exchange requests and responses.

Relying on a central server to provide portions of IM functionality may contradict the objectives of using a peer-to-peer network to support the IM application, because a peer-to-peer network may be implemented to eliminate the need for a server and the accompanying resource drain required to setup and maintain the server. The claimed asynchronous messaging system may implement a security process that may reduce or eliminate the need for server based security, thereby providing a more server independent approach to asynchronous messaging. The claimed method and system may use a non-server based caching system, such as a distributed hash table to facilitate in buddy list management.

Figure 4:
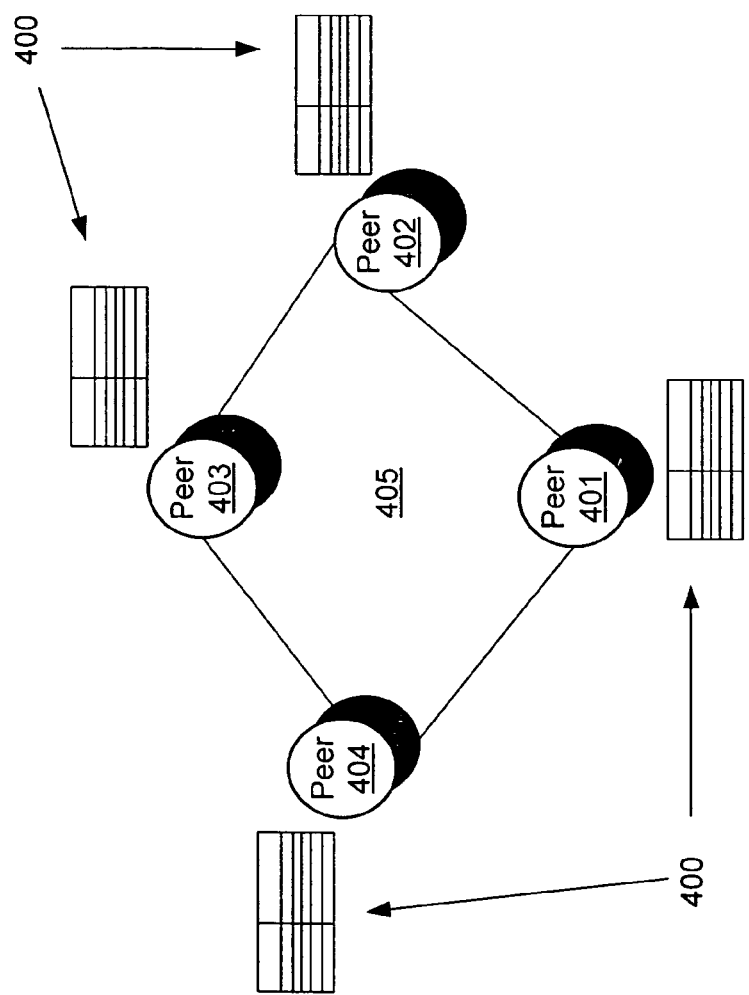
FIG. 4 illustrates a distributed hash table.

FIG. 4, illustrates a distributed hash table (DHT) 400. The DHT may represent a server-independent persistent indexing system. The distributed hash table 400 may be maintained over a group of peer entities 401-404 that form a peer-to-peer network 405. The entries in a distributed hash table 400 may be logically divided or grouped using, for example, a hash function. The hash function may group, or cluster entries together in some logical order so that retrieval may be made more efficient. A DHT may have two primary properties: 1) distribution of table contents across a plurality of nodes, such as nodes 401-404; and 2) a routing mechanism (not shown) that provides a method for publishing and retrieving records.

The routing mechanism and distribution used in a DHT may be provided by an overlay or substrate protocol such as Chord, Pastry, PNRP, Tapestry, etc. These substrate protocols may maintain the DHT for a P2P network and provide a data caching service over the DHT that may allow users to publish persistent data records in a peer-to-peer fashion. These records may persist in the DHT until they are explicitly deleted by the publisher or until they expire. The protocols may be based on a hash function as described above that clumps records together in an organized manner, thereby making retrieval more efficient. It should be noted that because the DHT may be built on a peer-to-peer architecture, the DHT may not require Internet connectivity. The DHT could be built on a subnet scope or local network scope.

Figure 5:
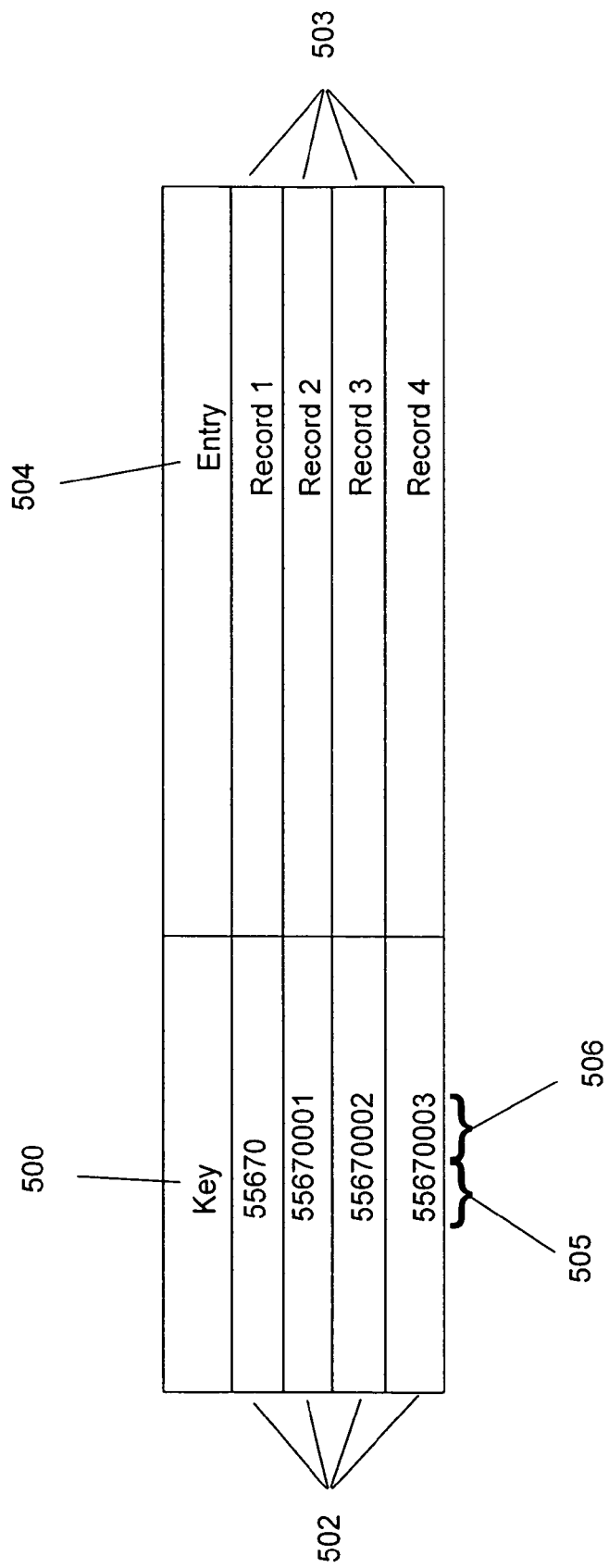
FIG. 5 illustrates a unique key table having entries using a combination of primary IDs and instance IDs.

Because there may be multiple IM requests for a particular user, caching or index services may be required to aggregate multiple records for a particular user or key. While some DHT systems are capable of storing multiple records or entries under a single ID, i.e., non-unique keys, some DHT systems do not support non-unique keys and may only allow a single entry for each key. If a DHT does not support non-unique key entries, then a sequence may be appended to a primary key sequence to distinguish the entry from other entries of the same primary key. The appended number may be a monotonically-increasing value such that each node that wishes to publish an entry in the sequence will find the highest valued key currently published and used the appended value of the current highest plus one. This may be illustrated in the table of FIG. 5. A key column 500 illustrates a number of different keys 502 corresponding to a number of different records 503 under a records column 504. (The keys may be considered a part of the record, but for illustration, the record may be segmented as shown.) As illustrated in FIG. 5, a set of keys may begin with a common sequence, or primary ID 505, but may end with an appended sequence or instance ID 506. The instance ID 506 may be generated sequentially for each new entry under the primary ID 505 or be randomly generated. The primary characteristic of the instance ID 506 may be that it combines with the primary ID 505 to form a unique key for the particular index or DHT. In retrieving records from a DHT that allows multiple records to be published with the same key, the query may only need to query based on a primary ID. When the DHT requires unique keys, then by appending the "instance ID" to each key, a query may be performed for all entries having a primary ID sequence, thereby returning all records mapping to that primary key (e.g., all instance IDs).

Figure 6:
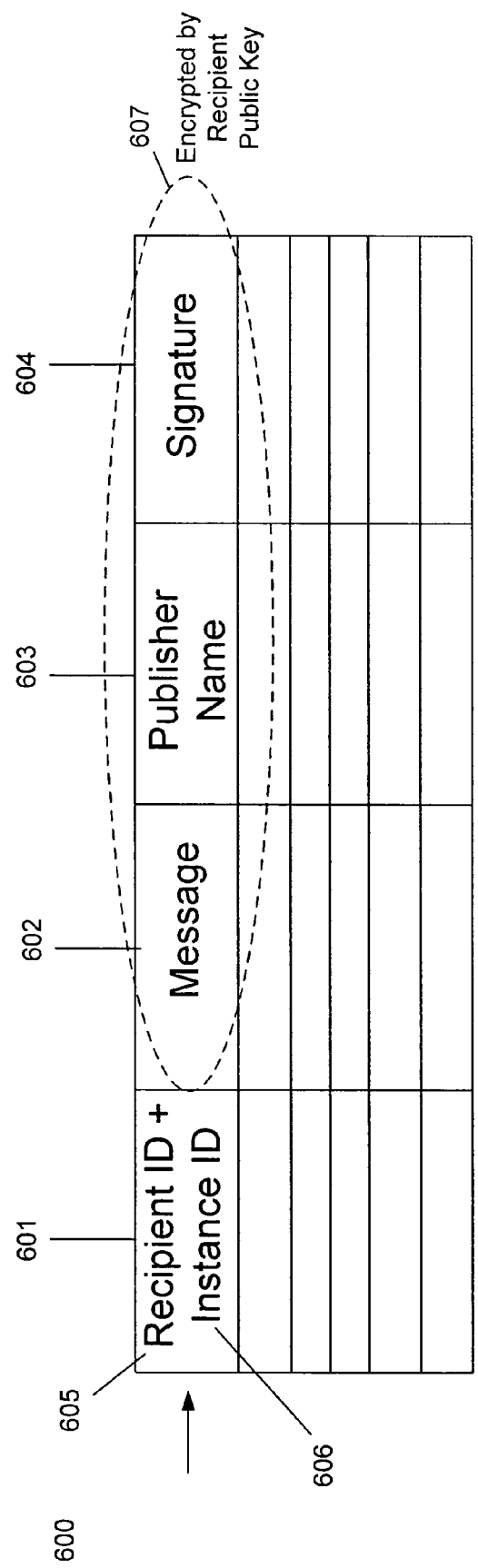
FIG. 6 illustrates a record used in an embodiment of the claims.

FIG. 6 illustrates a DHT entry used in a buddy list embodiment of the claims. The message or record 600 may include a key 601, a message 602, requestor identification data 603, and a signature 604. The key 601 may include a recipient ID 605 portion and an instance ID 606 portion. In a buddy list implementation of the claimed asynchronous messaging system, the message portion of the entry may indicate a buddy request or buddy response. The publisher name may be any identifying information, such as an ID or public key of the publisher.

In the case of a buddy requestor, this information would identify the requestor. The publisher name or identification information may be a Cryptographically Unique Identifier (CUI) call sign which is statistically unique to a user public key. For example, the CUI may be derived from a user public key using an algorithm, such as a hashing function. In one embodiment, the CUI may be used to represent a longer user identifier, such as a public key, in a shorter more user manageable form such as the Peer Names used in a peer-to-peer system described in U.S. patent application Ser. No. 10/882079, entitled "Callsigns." The signature 604 of the record may be signed using a publisher (e.g., the buddy list requestor) private key. The message or entire record may be encrypted 607 using a recipient public key.

Figure 7:
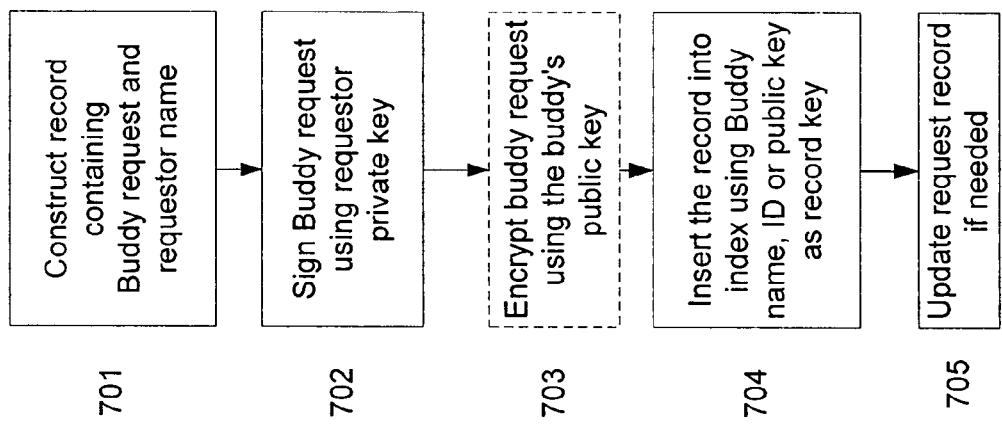
FIG. 7 illustrates a buddy request publication process.

FIG. 7 illustrates a buddy request publishing process embodiment. A buddy requestor wishing to form a buddy association with a target user may first construct a buddy request record containing a request message, a requester name, requestor public key, and signature 701. The requestor may sign the buddy request using the requestor's private key 702. Optionally, the requestor may also encrypt the buddy request using the target user or buddy public key 703. The requestor may then insert the buddy request record into a DHT, using the target user's name as the record key 704. The requestor may refresh the record, as needed until a response is received 705.

In an enhanced embodiment, block 705 may entail using an optional duration parameter. In this embodiment, the record 600 of FIG. 6 may be supplemented with a duration parameter. This duration parameter may provide an expiration time or a validity duration. The length of the duration may correspond directly with the strength of encryption used to provide the public private key pairs used in the authentication system described above. Alternatively, the duration may correspond to other security parameters. Accordingly, block 705 of FIG. 7 may include checking the record to determine whether the duration parameter has expired. If the duration parameter has expired, the record or entry may be invalid and may be removed from the DHT. If the user or IM program intends for the request to persist, then the entry may be replaced with a new entry (perhaps under a different instance ID) for the same buddy.

Figure 8:
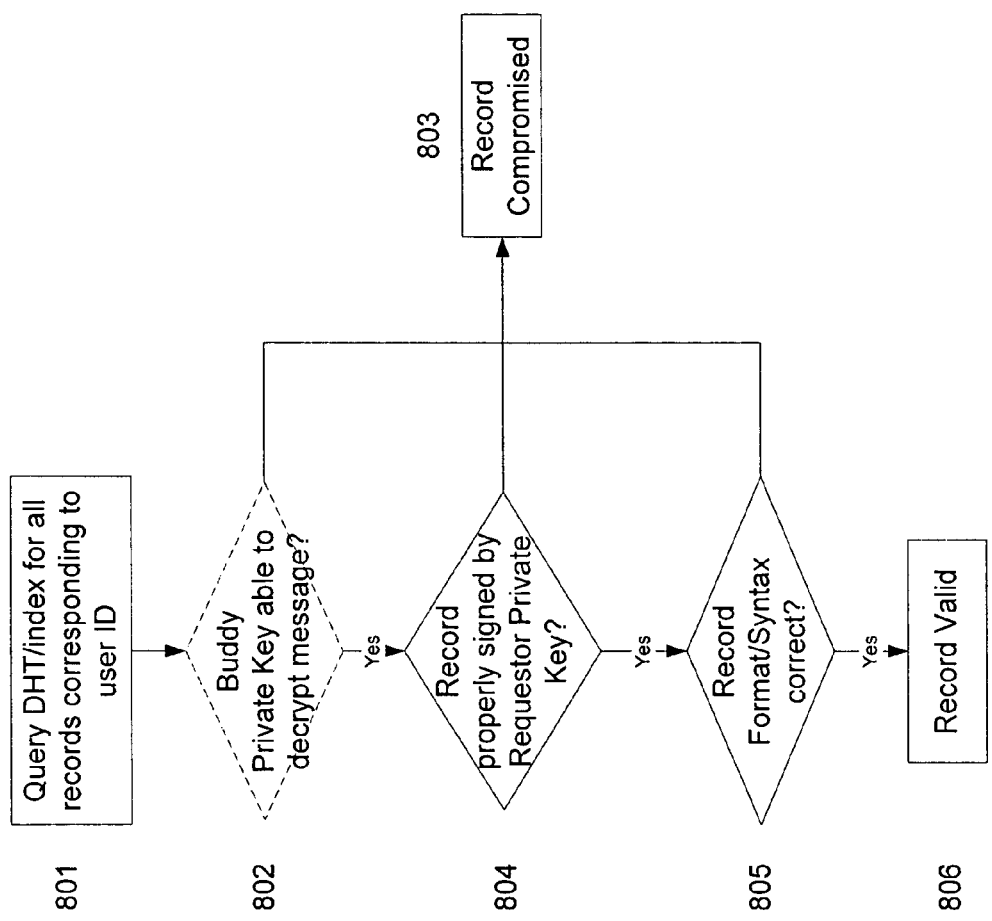
FIG. 8 illustrates a buddy request retrieval process.

FIG. 8 illustrates a message retrieval process embodiment. A query may be made to the DHT for all records under a recipient's ID 801. If the DHT does not support non-unique keys, then the query may be for all records containing, in part, the recipient's ID (where the other portion of the ID may be an instance ID appended to the recipient ID, as discussed above). Thus, all pending buddy requests published to the DHT may be retrieved via the query. The retrieved request may first be decrypted (if necessary) using the private key of the retriever 802. This process may provide assurance that the message is intended for the user who retrieved the record. If the record cannot be decrypted, the message may be compromised 803 or corrupted, and the record may be discarded. If the record is properly decrypted, the signature may be checked against the public key of the requestor/sender to determine whether the message came from the requester 804. If the signature is not verified, the message may be compromised 803.

The public key of the requestor/sender may be part of the message body. Alternatively, the requestor name, which may be, for example, a user ID, the recipient may be able to obtain the public key corresponding to the requester user name via a public key directory. This public key directory may be an existing portion of the IM system or part of an operating system or network infrastructure upon which the IM application is running. For example, this functionality may be provided by the peer-to-peer network.

If the signature is verified by the public key of the requestor/sender, then the message may be further checked for an expected format and syntax 805, otherwise, the message may be compromised 803. Checking for message format may be used, for example, to ensure that the message was not hacked to match the signature. While providing a hacked message to match an encrypted signature may be statistically difficult, it may not be impossible. Hacking, however, may result in a message that does not conform to intended or expected format. Thus, a first check of the message may be made to determine whether the message format complies with an expected format. For example, where contact information is communicated, the contact information may require a ten character format.

Alternatively, or in addition, the syntax of the message may be checked for. For example, the contact information may be limited to a list of options and specific relations between those options. Therefore, if the format requires two entries, and the first entry is related to the second entry (syntax) and they do not match this expected syntax, then someone or something may have tampered with the message 803.

FIG. 9 illustrates a user/buddy response process once it determines a valid request. For each request, the user may construct a response message indicating whether the request was accepted or declined, along with any credentials required 901. These credentials may be used, for example, to enable buddy privileges for the requestor. The user may sign the message using the user private key 902. Optionally, the user may encrypt the response message using the requestor public key 903. The user may then publish the response message into the DHT, using the requestor's name, key or ID as the record key 904. The response record may be updated as necessary 905. This update may be dependent on a duration parameter similar to the process described above. When requestor comes online, the requestor may obtain the published response records in a manner similar to the process illustrated in FIG. 8. If the response is an acceptance, then the requestor may use the credentials to enable communication with the buddy and obtain presence information on the buddy.

For serverless peer-to-peer networks running an instant messaging application, the claimed system may eliminate the dependency on a server to provide buddy list functionality. The asynchronous messaging system claimed may also provide a mechanism for message notifications that may be used in a number of applications. For example, the claimed system may be used to provide an RSS feed. In this embodiment, new content may be posted under an ID key. An RSS aggregator may then periodically query the DHT store for updated feeds based on the ID, which may correspond to a particular feed. The instance ID may contain sequence information which acts to mark the records by date and/or time. An aggregator may then retrieve the feeds in an ordered manner. Furthermore, the claimed system may be used in a document management system or file replication system in which the DHT may be used to provide update notifications. The asynchronous messaging system may actually provide the actual content changes if they are posted in the manner described above.

The invention claimed is:

1. A method for publishing and receiving asynchronous messages in a server-less environment comprising:
   publishing a message from a sender to a recipient to a distributed hash table (DHT) based at least in part on associating a first record key with the message, the first record key comprising an identifier of the recipient, the message comprising at least one of an identifier of the sender, message content, or a public key of the sender; and receiving a response to the message from the DHT based at least in part on an online status of the sender and a second record key associated with the response, the second record key comprising the identifier of the sender, at least some of at least one of publishing or receiving implemented at least in part via a processing unit.

2. The method of claim 1, the message comprising at least one of a buddy request, a real simple syndication (RSS) feed, or an updated file, the DHT comprising a routing mechanism configured to retrieve at least one of the message or the response.

3. The method of claim 2, the routing mechanism comprising at least one of one or more overlay protocols or one or more substrate protocols configured to provide data caching service.

4. The method of claim 3, at least one of the overlay protocols or substrate protocols based at least in part on one or more hash functions.

5. The method of claim 1, comprising:
signing the message using a private key of the sender; and
encrypting the message using a public key of the recipient.

6. The method of claim 5, the message comprising a duration parameter associated with a strength of encryption based at least in part on at least one of the public key of the sender, the private key of the sender, the public key of the recipient, or a private key of the recipient.

7. The method of claim 6, comprising removing the message from the DHT upon determining an expired duration parameter.

8. The method of claim 1, the DHT based at least in part on at least one of a subnet scope or a local network scope.

9. The method of claim 1, at least one of the first record key or the second record key comprising at least one of a recipient identification number or an instance identification number.

10. The method of claim 1, comprising decrypting the response using a private key of the sender.

11. A computer-readable storage media comprising computer-executable instructions, which when executed at least in part via a processing unit on a computer perform acts, comprising:
publishing a message from a sender to a recipient to a distributed hash table (DHT) based at least in part on associating a first record key with the message, the first record key comprising an identifier of the recipient, the message comprising at least one of an identifier of the sender, message content, or a public key of the sender; and receiving a response to the message from the DHT based at least in part on an online status of the sender and a second record key associated with the response, the second record key comprising the identifier of the sender.

12. The computer-readable storage media of claim 11, the identifier of the sender comprising a cryptographically unique identifier (CUI) call sign based at least in part on a peer name corresponding to the sender.

13. The computer-readable storage media of claim 12, the CUI sign shorter than the public key of the sender and based at least in part on a number of most significant bits of a Peer Name Resolution Protocol (PNRP) identifier.

14. The computer-readable storage media of claim 11, at least one of the first record key or the second record key comprising at least one of a recipient identification number or an instance identification number.

15. The computer-readable storage media of claim 11, comprising removing the message from the DHT upon determining an expired duration parameter.

16. A method for responding to asynchronous messages in a server-less environment comprising:
querying a distributed hash table (DHT) for a first record key comprising an identifier of a recipient, the first record key associated with a message from a sender to the recipient, the message comprising at least one of an identifier of the sender, message content, or a public key of the sender, the DHT configured to provide data caching service;

retrieving the message from the DHT, at least one of the querying or retrieving based at least in part on an online status of the recipient; and publishing a response to the message to the DHT based at least in part on at least one of a recipient input and associating a second record key with the response, the second record key comprising the identifier of the sender, at least some of at least one of querying, retrieving, or publishing implemented at least in part via a processing unit.

17. The method of claim 16, comprising:
signing the response using a private key of the recipient; and
encrypting the response using the public key of the sender.

18. The method of claim 16, comprising decrypting the message using a private key of the recipient.

19. The method of claim 16, comprising determining whether the message comprises at least one of an expected format or syntax and publishing the response based at least in part on the determination.

20. The method of claim 16, comprising obtaining the public key of the sender via a public key directory.

* * * * *